(No Model.) 2 Sheets—Sheet 1.
I. W. LITCHFIELD & T. W. SANFORD.
BICYCLE BRAKE.
No. 533,601. Patented Feb. 5, 1895.
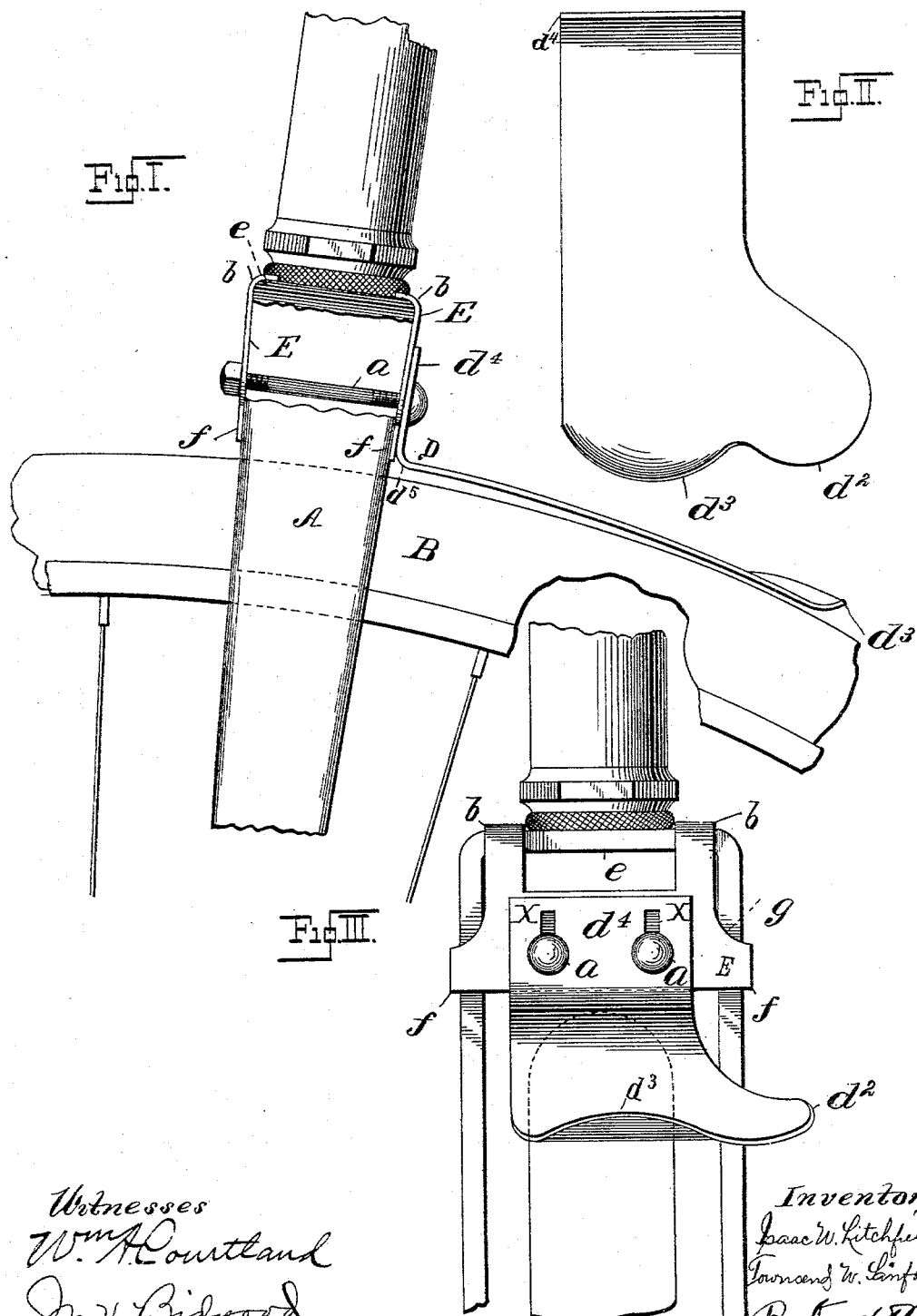

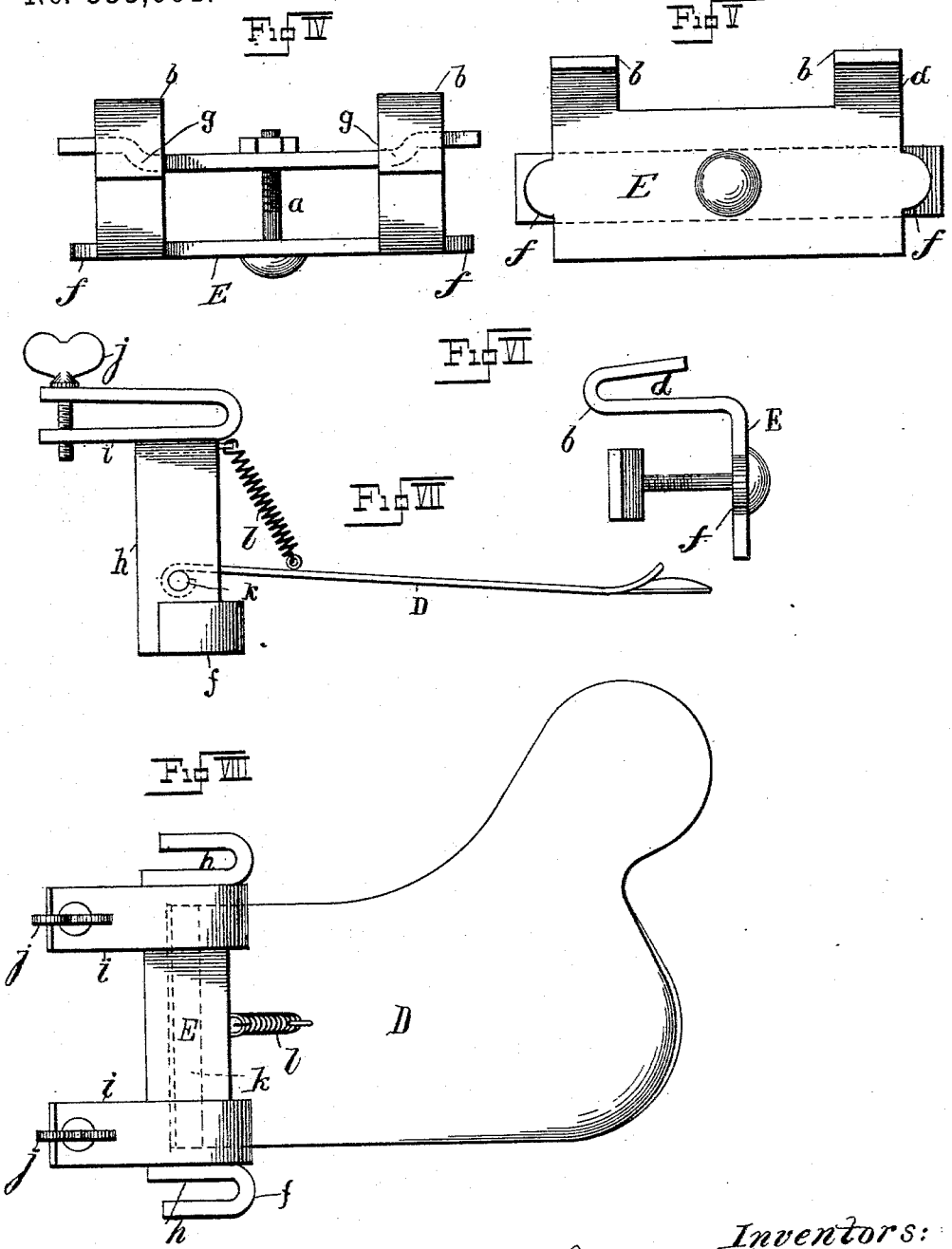

UNITED STATES PATENT OFFICE.

ISAAC W. LITCHFIELD AND TOWNSEND W. SANFORD, OF WARWICK, NEW YORK.

BICYCLE-BRAKE.

SPECIFICATION forming part of Letters Patent No. 533,601, dated February 5, 1895.

Application filed June 29, 1893. Serial No. 479,137. (No model.)

*To all whom it may concern:*

Be it known that we, ISAAC W. LITCHFIELD and TOWNSEND W. SANFORD, citizens of the United States, residing in Warwick, county of Orange, State of New York, have invented certain new and useful Improvements in Bicycle-Brakes, of which the following is a specification.

The object of our invention is to provide an improved brake for a bicycle of the class that can be applied upon the wheel by pressing the foot upon it.

The invention consists in a spring acting plate or member of novel construction adapted to bear upon a wheel tire, and having a projecting portion for attachment to a fork or frame of a bicycle.

The invention further consists in the combination with the fork or frame of a bicycle and a wheel, of a brake consisting of a spring acting plate, carried by said fork or frame and lying in proximity to the wheel tire and novel means for connecting said brake and fork.

The invention also consists in the novel details of improvement and the combinations of parts that will be more fully hereinafter set forth and then pointed out in the claims.

Referring to the accompanying drawings which form a part of this specification:—Figure I is a side view of a portion of a bicycle fork or frame and the wheel, showing the application of our brake. Fig. II is a detail top view of the brake. Fig. III is a rear elevation of the parts shown in Fig. I. Fig. IV is a top view of a modified form of clamp. Fig. V is a rear view of the same. Fig. VI is a side view thereof. Figs. VII and VIII are respectively side views of the clamp and brake, illustrating another modified form of clamp.

In the accompanying drawings the letter A indicates a portion of the fork or frame of a bicycle for the front wheel and B indicates the wheel.

D is our improved brake which may be suitably connected (either permanently or removably) with the fork or frame A.

The brake D consists essentially of a piece of spring metal, preferably steel, of suitable thickness, and it is placed close to the wheel B, so that the latter can rotate without engaging it, but when a person presses upon the brake it will be forced against the wheel tire.

The brake D is shown at its free end, provided with an offset $D^2$, for engagement with a person's foot, said offset being at one side of the wheel B. The free end of the brake D is also preferably turned outwardly or rolled at $D^3$ so that the wheel A may freely pass beneath it without injury.

The inner end of brake D in Fig. I, is shown turned upwardly at $D^4$, whereby it is supported. The connection shown in Figs. I and II for detachably holding the brake D upon the forks or frame A consists primarily of two bars or plates E, E connected by bolts or screws $a$, $a$ that also pass through projection $D^4$ of brake plate D or otherwise suitably arranged for the durpose. These bars or plates E are placed on opposite sides of the forks A and when the bolts or screws $a$ are tightened, said bars E, E and the brake D will be firmly held in place. To keep the bars or plates E from slipping down, their upper edges or the edges of projections $b$ are turned over or outwardly at $d$ to rest upon the cross piece $e$ of fork A. Lateral motion of the brake D and bars or plates E is prevented by the ends of bars or plates E or projections $f$ thereof, being turned over or outwardly at $g$, to engage the forks A, as clearly shown. By having the projections $b$ and $f$ on the bars or plates E, their weight is reduced without sacrificing strength.

With the foregoing arrangement the brake can be readily detached when desired.

The device is simple in construction and readily operated by merely pressing the foot upon brake D to force it into contact with the wheel.

In the arrangement shown in Figs. IV, V VI the projections $b$, $b$ are carried forwardly or outwardly to lie beneath the cross part $e$ of fork A, their ends being bent to form hooks $d$ that lie on cross part $e$. The side extensions of lugs $f$ lie against the forks A, and the ends of the bar E are suitably bent at $g$ to keep them from sliding on forks A.

In the modification shown in Figs. VII and

VIII the cross bar E, is in the form of a yoke, having arms h provided with the hooked parts f to engage forks A. The bar E is shown provided with clips i arranged to clasp the cross bar e of forks A, thumb screws or the like j, being used to hold the parts upon the cross bar e. In this case the brake or plate D is shown pivotally connected at k with the yoke E, h, a spring l connecting bar E with brake D, acting to hold the latter normally out of contact with the wheel. In Fig. I the projection $D^4$ is turned at such an angle as to cause the brake D to normally clear the wheel, the spring action resulting from the bend $D^5$; but it will be observed that the spring action may be obtained either by the nature of the brake plate D or by a separate spring.

This brake will be found very useful for light racing bicycles as reducing weight, and also for "coasting" as a foot can readily be applied to it when it is removed from the treadles.

The shape of the brake plate D can be changed from that shown, although we find a practically flat plate advantageous.

The holes in the clamp plates and brake may be elongated vertically as shown at X in Fig. III to allow for adjustment of the brake vertically.

Having thus described our invention, the following is what we claim as new therein and desire to secure by Letters Patent:

1. The combination of a bicycle fork having cross piece e, with a brake consisting of a plate or member to bear upon a wheel, a bar or plate having bent portions to lap on said fork and cross piece and means for clamping said bar or plate upon the fork, substantially as described.

2. The combination of a bicycle fork or frame, having a cross piece e with a brake consisting of a plate or member to bear upon a wheel, bars or plates having bent portions to lap on said fork or frame and cross piece and bolts or screws for clamping said bars upon said fork, and for holding said brake plate upon said bars, substantially as described.

ISAAC W. LITCHFIELD.
TOWNSEND W. SANFORD.

Witnesses:
H. V. D. HOYT,
H. H. SMITH.